US009158918B2

(12) United States Patent
Li et al.

(10) Patent No.: US 9,158,918 B2
(45) Date of Patent: Oct. 13, 2015

(54) METHOD AND APPARATUS FOR DETERMINING MALICIOUS PROGRAM

(71) Applicant: TENCENT TECHNOLOGY (SHENZHEN) COMPANY LIMITED, Shenzhen (CN)

(72) Inventors: Wei Li, Shenzhen (CN); Yongliang Tong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/087,030

(22) Filed: Nov. 22, 2013

(65) Prior Publication Data

US 2014/0165199 A1    Jun. 12, 2014

Related U.S. Application Data

(63) Continuation of application No. PCT/CN2013/078894, filed on Jul. 5, 2013.

(30) Foreign Application Priority Data

Jul. 16, 2012 (CN) .......................... 2012 1 0245337

(51) Int. Cl.
*G06F 21/00* (2013.01)
*G06F 21/56* (2013.01)

(52) U.S. Cl.
CPC .............. *G06F 21/562* (2013.01); *G06F 21/56* (2013.01)

(58) Field of Classification Search
USPC .................................................... 726/22, 23
See application file for complete search history.

(56) References Cited

U.S. PATENT DOCUMENTS

| 7,096,501 | B2 * | 8/2006 | Kouznetsov et al. | 726/24 |
| 7,779,472 | B1 * | 8/2010 | Lou | 726/24 |
| 8,302,188 | B2 * | 10/2012 | Sato et al. | 726/22 |
| 2006/0174343 | A1 * | 8/2006 | Duthie et al. | 726/23 |
| 2007/0250927 | A1 * | 10/2007 | Naik et al. | 726/22 |
| 2009/0025063 | A1 * | 1/2009 | Thomas | 726/4 |
| 2009/0037976 | A1 * | 2/2009 | Teo et al. | 726/1 |

FOREIGN PATENT DOCUMENTS

| CN | 1818823 A | 8/2006 |
| CN | 1845120 A | 10/2006 |

(Continued)

OTHER PUBLICATIONS

Detection of injected, dynamically generated, and obfuscated malicious code; JC Rabek et al; Proceedings of the WORM'03, Oct. 27, 2003; 7 pages.*

(Continued)

*Primary Examiner* — Jason Lee
(74) *Attorney, Agent, or Firm* — Anova Law Group, PLLC

(57) ABSTRACT

Various embodiments provide methods, apparatus, and computer readable medium for determining a malicious program. In an exemplary method, a specific application programming interface (API) within an application program can be obtained. Call logic for calling the specific API can be determined. The call logic can include a triggering event to trigger the specific API to be called, a feedback path provided after the specific API is called, or a combination thereof. Whether the application program is a malicious program can be determined according to the call logic.

16 Claims, 4 Drawing Sheets

(56) References Cited

FOREIGN PATENT DOCUMENTS

| | | | |
|---|---|---|---|
| CN | 101414997 | A | 4/2009 |
| CN | 101959193 | A | 1/2011 |
| CN | 102314577 | A | 1/2012 |
| KR | 20110128632 | A | 11/2011 |

OTHER PUBLICATIONS

Mining Specifications of Malicious Behavior; M. Christodorescu et al; ESEC/FSE'07, Sep. 3-7, 2007, Cavtat near Dubrovnik, Croatia. Copyright 2007 ACM; 10 pages.*

The World Intellectual Property Organization (WIPO) International Search Report for PCT/CN2013/078894 Sep. 5, 2013.

* cited by examiner

METHOD AND APPARATUS FOR DETERMINING MALICIOUS PROGRAM

CROSS-REFERENCES TO RELATED APPLICATIONS

This application is a continuation of PCT Patent Application No. PCT/CN2013/078894, filed on Jul. 5, 2013, which claims priority to Chinese Patent Application No. CN 201210245337.X, filed on Jul. 16, 2012, the entire content of all of which are incorporated herein by reference.

FIELD OF THE DISCLOSURE

The present disclosure generally relates to the field of computer technology and particularly relates to methods and apparatus for determining a malicious program.

BACKGROUND

With development of software technology, more and more application programs are developed and used to enrich people's life with significant convenience. However, there are malicious programs appeared for the purposes of stealing user's private information and/or phone charges. This causes personal information and property to become unsafe.

Currently, malicious programs may be identified by manually testing the application program. Specifically, various functions of the application program may be manually triggered. The operating behavior of the application program may be observed and analyzed to determine whether the application program is a malicious program.

However, such manual testing of the application program to determine whether the application program is a malicious program requires high cost but with slow testing speed and is thus inefficient.

BRIEF SUMMARY OF THE DISCLOSURE

According to various embodiments, there is provided a method for determining a malicious program by obtaining a specific application programming interface (API) within an application program. Call logic for calling the specific API can be determined and the call logic can include a triggering event to trigger the specific API to be called, a feedback path provided after the specific API is called, or a combination thereof. It can be determined whether the application program is a malicious program according to the call logic.

According to various embodiments, there is also provided an apparatus for determining a malicious program. The apparatus can include an obtaining module, a first determining module, and a second determining module. The obtaining module can be configured to obtain a specific application programming interface (API) within an application program. The first determining module can be configured to determine call logic for calling the specific API, wherein the call logic comprises a triggering event to trigger the specific API to be called, a feedback path provided after the specific API is called, or a combination thereof. The second determining module can be configured to determine whether the application program is a malicious program according to the call logic.

According to various embodiments, there is further provided a computer readable medium containing executable computer instructions for performing a method for determining a malicious program. In the method, a specific application programming interface (API) within an application program can be obtained. Call logic for calling the specific API can be determined and the call logic can include a triggering event to trigger the specific API to be called, a feedback path provided after the specific API is called, or a combination thereof. It can be determined whether the application program is a malicious program according to the call logic.

In this manner, by obtaining the specific API in the application program and determining the call logic for calling the specific API, it is determined whether the application program is a malicious program according to the call logic for calling the specific API. This can avoid manual testing procedures and improve testing efficiency. In addition, by using call logic for calling a specific API in an application program for possibly stealing user's private information and phone charges to determine whether the application program is a malicious program, degree of accuracy for determining a malicious program can be improved.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
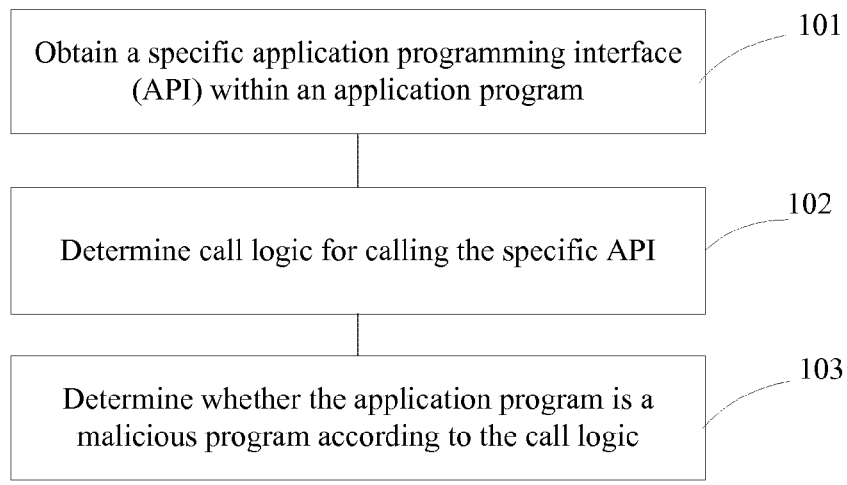
FIG. 1 depicts an exemplary method for determining a malicious program in accordance with various disclosed embodiments.

FIG. 1 depicts an exemplary method for determining a malicious program in accordance with various disclosed embodiments.

In Step 101, a specific application programming interface (API) within an application program is obtained.

In Step 102, call logic for calling the specific API is determined. The call logic can include a triggering event to trigger the specific API to be called and/or a feedback path provided after the specific API is called.

In Step 103, according to the call logic, it is determined whether the application program is a malicious program.

In this manner, by obtaining a specific API within the application program to determine call logic for calling the specific API, and whether the application program is a malicious program can be determined according to the call logic. The exemplary method can avoid the manual testing procedure and improve testing efficiency. In one embodiment, determining a malicious application according to call logic of a specific API that may potentially steal user's privacy and/or phone charges within an application program can improve the degree of accuracy for determining whether the application program is a malicious program.

Figure 2:
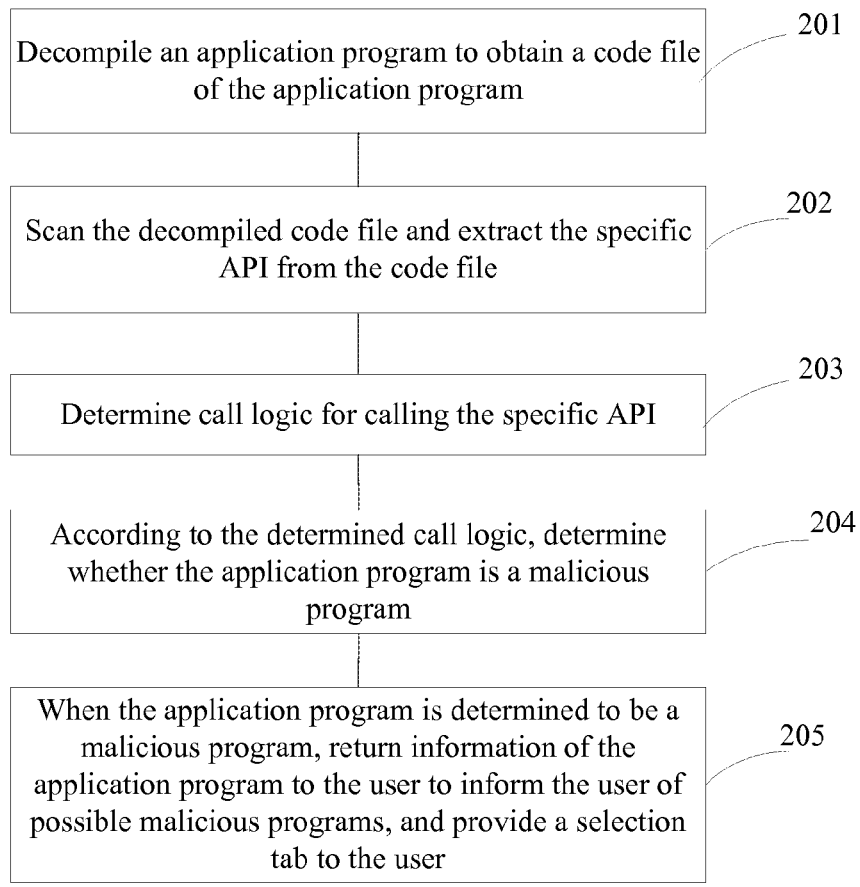
FIG. 2 depicts another exemplary method for determining a malicious program in accordance with various disclosed embodiments.

FIG. 2 depicts another exemplary method for determining a malicious program in accordance with various disclosed embodiments.

In Step 201, an application program is decompiled to obtain a code file of the application program.

In Step 202, the code file from decompiling can be scanned to extract the specific API from the code file. The specific API may include, but is not limited to, a function of accessing user's private information, a function of modifying user's private information, a network access function, a call function, a message feedback function, a function of modifying system settings, a function of silently installing a third-party application program, and/or a function of terminating a program process.

The function of accessing user's private information may include, but is not limited to, a function of reading user's address book, message (e.g., SMS) contents, call records, and/or contact information. The function of modifying user's private information may include, but is not limited to, a function of deleting message contents, modifying the message contents, and/or modifying the user's address book. The network access function may include, but is not limited to, a function of connecting to the network and accessing business for fee deductions, for example, a function of connecting to the network to send text messages for fee deductions and other business deductions. The call function is referred to a function of calling a called party to establish a connection for conversation, e.g., for making a phone call, etc. The message feedback function may include, but is not limited to, a function of intercepting and replying to a text message for fee deductions and/or a function of automatically sending a text message for fee deductions.

In many cases, the obtained specific API may steal user's private information and/or phone charges, when the application program is in operation. Alternatively, when the application program is in operation, the obtained specific API may silently install, e.g., a Trojans program, software products with charges, or other possible third-party application programs, and/or maliciously terminate other currently-operating programs.

For example, when the specific API is a function of reading user's address book, message contents, call records, and/or contact information, the application program may be a malicious program for the purposes of stealing user's private information. Once this application program is in operation, the user's address book, message contents, call records, contact information and/or other user's private information may be stolen.

When the specific API is a function of connecting to a network and accessing a business for fee deductions, the application program may be a malicious program for the purposes of stealing user's phone charges. Once this application program is in operation, the network can be connected to consume user's network fees. Further, the business for fee deductions may be accessed and the user's phone charges may be consumed.

When the specific API is a function of silently installing a third-party application program and once this application program is in operation, a Trojans program and/or some software products with charges may be silently installed. This can cause potential safety issues and/or loss in phone charges to the user.

When the specific API is a function of terminating a program process and once this application program is in operation, the currently-operated processing of office software products, instant messaging software products, and/or browser may be maliciously terminated.

In Step 203: call logic for calling the specific API is determined. The call logic can include a triggering event to trigger the specific API to be called and/or a feedback path provided after the specific API is called.

It is necessary to determine the call logic for calling the specific API. This is because it is possible that the specific API is called in a legal situation. For example, when the specific API is a function of reading user's address book, calling the user's address book may be for managing the user's address book (e.g., which is a legal use), not for stealing the user's address book (e.g., which is a malicious use). Therefore, to further determine whether the API interface is used for the purposes of stealing the user's private information and/or the user's phone charges, it is necessary to analyze the call logic for calling the specific API.

In various disclosed embodiments, determining the call logic for calling the specific API can include: analyzing classes, functions, procedure events, and calling relationship between functions in the decompiled code file, and extracting the call logic for calling the specific API.

In Step 204, according to the determined call logic, it is determined whether the application program is a malicious program. For example, the determining of whether the application program is a malicious program according to the call logic may include: matching the call logic with a pre-stored logic model that provides call logic for malicious programs. For example, when a terminal device installed with application programs is powered on to self-start, the specific API may be executed and the calling results may be returned to a specific path (a designated address), etc.

The determining of whether the application program is a malicious program according to the call logic may further include: determining that the application program is a malicious program, when the call logic matches with the call logic of the logic model; and determining that the application program is safe, when the call logic does not match with any call logic in the logic model.

In an exemplary embodiment, the called specific API is likely to be malicious, if the determined call logic is in a condition: that the specific API is called to execute without authorization (e.g., the specific API is called to execute when the terminal device is powered on to self-start), or that the calling results is returned to a designated address after the specific API is called.

In specific embodiments where the specific API is a function of reading user's address book, message (e.g., SMS) contents, call records, and/or contact information and the determined specific API is called having a call logic: that the specific API is called when the terminal device is powered on to self-start; that the user's address book, message (e.g., SMS) contents, call records, and/or contact information obtained after the specific API is called are returned to a designated address; and that the call logic indicates that the specific API is called to execute without being authorized by the user, the application program is considered as a malicious program for the purposes of stealing the user's address book, message contents, call records, contact information, and/or other private information of the user.

In specific embodiments where the specific API is a function of connecting to a network to access a business for fee deductions and the determined specific API is called having a call logic connecting to a network to access a business for fee deductions via the specific API when the device is powered on to self-start, and that the call logic indicates that the action for accessing the business for fee deductions is not authorized by the user, the application program is considered as a malicious program for the purposes of consuming user's network resource and the user's phone charges.

In specific embodiments where the specific API is a function of intercepting and replying a message for fee deductions and the determined specific API is called having a call logic monitoring and intercepting the message for fee deductions, and that once the message for fee deductions is replied thereto, the user's phone charges are consumed, the application program is considered as a malicious program for the purposes of consuming the user's phone charges.

In specific embodiments where the specific API is a function of silently installing a third-party application program or a function of terminating a program process and the determined specific API is called having a call logic: automatically installing some software products with charges/fees or terminating currently operated programs without authorization by the user when the application program is in operation (and installing software products with charges may cause loss of user's phone charges and terminating the currently operated programs may cause user's data loss), the application program is considered as a malicious program for the purposes of consuming the user's phone charges.

In Step 205, when the application program is determined to be a malicious program, information of the application program including, for example, an icon, name, and/or installation path of the application program, is returned to the user to inform the user of possible malicious programs. Further, the user can also be provided with a selection tab such that the user can choose whether to uninstall this application program based on the selection tab.

In this manner, by obtaining the specific API in the application program and determining the call logic for calling the specific API, it is determined whether the application program is a malicious program according to the call logic for calling the specific API. This can avoid manual testing procedures and improve testing efficiency. In addition, by using call logic for calling a specific API in an application program for possibly stealing user's private information and phone charges to determine whether the application program is a malicious program, degree of accuracy for determining if it is a malicious program can be improved.

Figure 3:
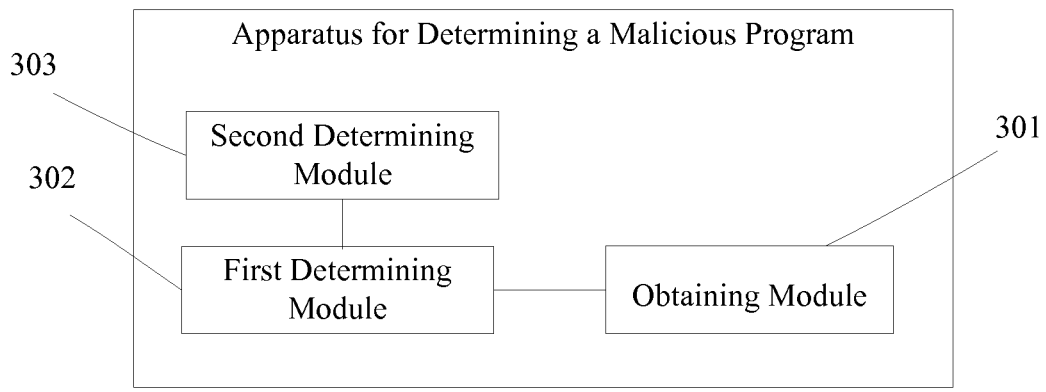
FIG. 3 depicts an exemplary apparatus for determining a malicious program in accordance with various disclosed embodiments.

FIG. 3 depicts an exemplary apparatus for determining a malicious program in accordance with various disclosed embodiments. The exemplary apparatus can include an obtaining module 301, a first determining module 302, and/or a second determining module 303.

The obtaining module 301 is configured to obtain a specific API in an application program. The specific API can include, but is not limited to, a function of accessing user's private information, a function of modifying user's private information, a network access function, a call function, a message feedback function, a function of modifying system settings, a function of silently installing a third-party application program, and/or a function of terminating a program process.

The first determining module 302 is configured to determine call logic for calling the specific API. The call logic can include a triggering event to trigger the specific API to be called and/or a feedback path provided after calling the specific API. The second determining module 303 is configured, according to the call logic, to determine whether the application program is a malicious program.

Figure 4:
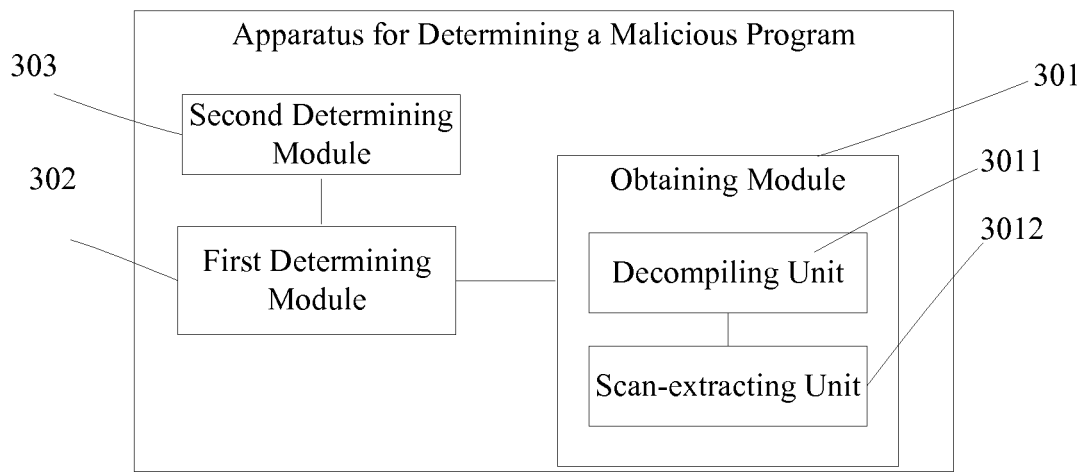
FIG. 4 depicts an exemplary obtaining module in accordance with various disclosed embodiments.

FIG. 4 depicts an exemplary obtaining module 301. The obtaining module 301 includes a decompiling unit 3011, and/or a scan-extracting unit 3012. The decompiling unit 3011 is configured to decompile the application program to obtain a code file of the application program. The scan-extracting unit 3012 is configured to scan the code file and extract the specific API within the code file.

Furthermore, the first determining module 302 is configured to analyze classes, functions, procedure events, and calling relationship between functions in the decompiled code file; and to extract the call logic for calling the specific API.

Figure 5:
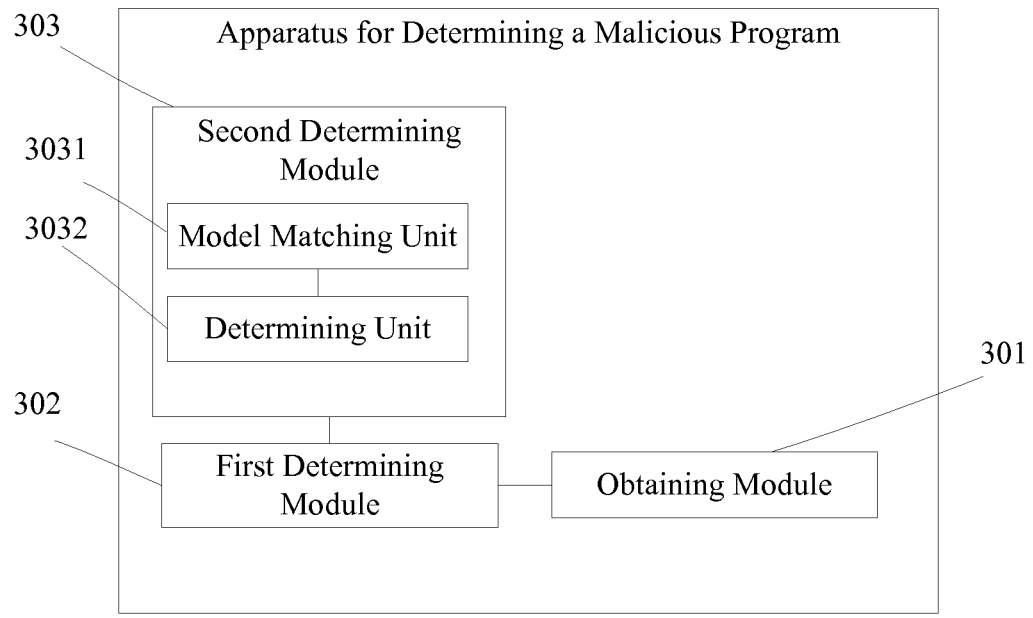
FIG. 5 depicts an exemplary second determining obtaining module in accordance with various disclosed embodiments.

FIG. 5 depicts an exemplary second determining obtaining module 303. The exemplary second determining obtaining module 303 can include a model matching unit 3031, and/or a determining unit 3032.

The model matching unit 3031 is configured to match the call logic with a pre-stored logic model that provides call logic for malicious programs. The determining unit 3032 is configured to determine that the application program is a malicious program, when the call logic matches with the call logic in the logic model. The determining unit 3032 is configured to determine that the application program is a safe program, when the call logic does not match with any call logic in the logic model.

Figure 6:
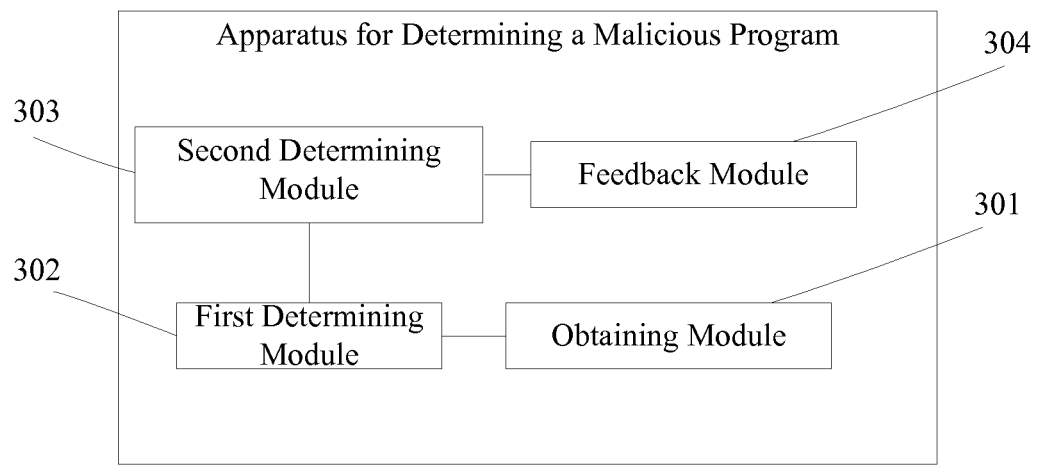
FIG. 6 depicts another exemplary apparatus for determining a malicious program in accordance with various disclosed embodiments.

In FIG. 6, the exemplary apparatus can further include a feedback module 304. The feedback module 304 is configured to return information of the application program to the user to inform the user of possible malicious programs, when the application program is determined to be a malicious program. The user can also be provided with a selection tab such that the user can choose whether to uninstall this application program based on the selection tab.

In this manner, by obtaining the specific API in the application program and determining the call logic for calling the specific API, it is then determined whether the application program is a malicious program according to the call logic for calling the specific API. This can avoid manual testing procedures and improve testing efficiency. In addition, by using call logic for calling a specific API in an application program for possibly stealing user's private information and phone charges to determine whether the application program is a malicious program, degree of accuracy for determining if it is a malicious program can be improved.

In various embodiments, the application program may be installed on a terminal device. As used herein, a terminal device may refer to any appropriate user terminal with certain computing capabilities including, for example, a personal computer (PC), a work station computer, a server computer, a hand-held computing device (tablet), a smart phone or mobile phone, or any other user-side computing device.

Figure 7:
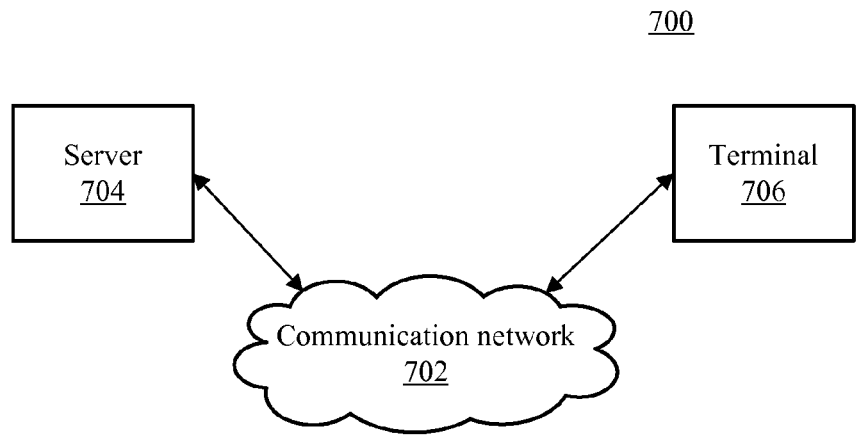
FIG. 7 depicts an exemplary environment incorporating certain embodiments of the present invention.

An exemplary terminal device can include a terminal 706 as depicted in FIG. 7. Specifically, FIG. 7 illustrates an exemplary environment 700 incorporating certain disclosed embodiments. As shown in FIG. 7, environment 700 may include a server 704, a terminal 706, and a communication network 702. The server 704 and the terminal 706 may be coupled through the communication network 702 for information exchange, such as message communications. Although only one terminal 706 and one server 704 is shown in the environment 700, any number of clients 706 or servers 704 may be included, and other devices may also be included.

Communication network 702 may include any appropriate type of communication network for providing network connections to the server 704 and terminal 706 or among multiple servers 704 or clients 706. For example, communication network 702 may include the Internet or other types of computer networks or telecommunication networks, either wired or wireless. The server 704 may refer one or more server computers configured to provide certain server functionalities, such as database management and search engines. A server may also include one or more processors to execute computer programs in parallel.

Figure 8:
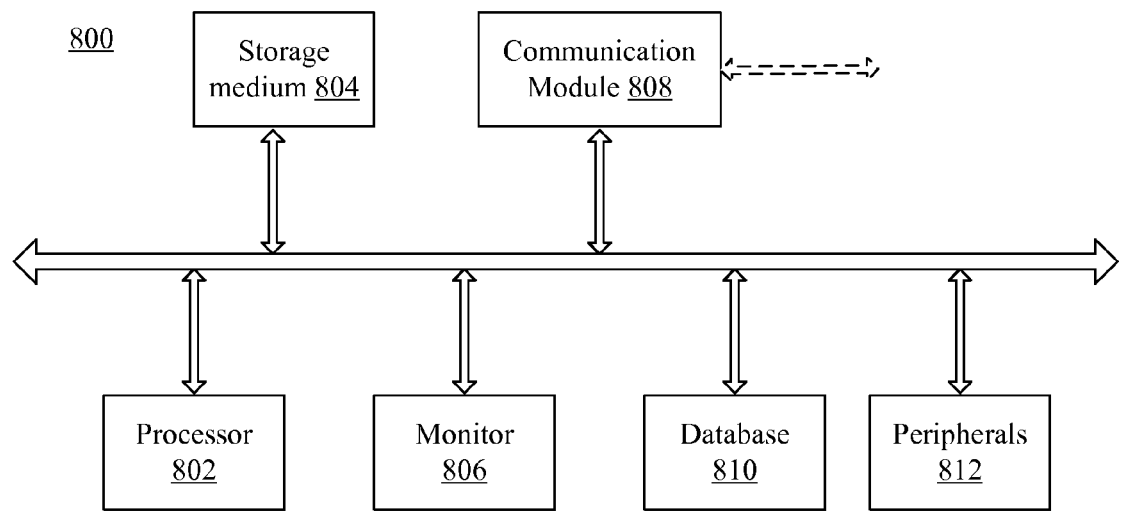
FIG. 8 depicts a block diagram of an exemplary computing system consistent with the disclosed embodiments.

The terminal (or terminal device) and the server may be implemented on any appropriate computing platform. FIG. 8 depicts a block diagram of an exemplary computer system 800 capable of implementing a terminal and/or a server.

As shown in FIG. 8, the computing system 800 may include a processor 802, a storage medium 804, a monitor 806, a communication module 808, a database 810, and peripherals 812. Certain devices may be omitted and other devices may be included.

Processor 802 may include any appropriate processor or processors. Further, processor 802 can include multiple cores for multi-thread or parallel processing. Storage medium 804 may include memory modules, such as ROM, RAM, and flash memory modules, and mass storages, such as CD-ROM, U-disk, hard disk, etc. Storage medium 804 may store computer programs for implementing various processes, when executed by processor 802.

Further, peripherals 812 may include I/O devices such as keyboard and mouse, and communication module 808 may include network devices for establishing connections through a wireless or wired communication network. Database 810 may include one or more databases for storing certain data and for performing certain operations on the stored data, such as database searching.

It should be noted that when the disclosed apparatus for determining a malicious program is implemented, the functional modules disclosed herein are for example only. Other modules can be added and exemplary modules can be removed, modified, or otherwise re-arranged. In various embodiments, the disclosed modules can be configured in one apparatus or configured in multiple apparatus as desired. The modules disclosed herein can be integrated in one module or in multiple modules. Each of the modules disclosed herein can be divided into one or more sub-modules, which can be recombined in any manner.

The disclosed embodiments can be examples only. In various embodiments, the disclosed apparatus for determining a malicious program can be used to implement the disclosed method for determining a malicious program. One of ordinary skill in the art would appreciate that suitable software and/or hardware (e.g., a universal hardware platform) may be included and used to predict, manage, and execute the disclosed schemes. For example, the disclosed embodiments can be implemented by hardware only, which alternatively can be implemented by software products only. The software products can be stored in a storage medium. The software products can include suitable commands to enable a terminal device (e.g., including a mobile phone, a personal computer, a server, or a network device, etc.) to implement the disclosed embodiments.

For example, various embodiments may include a computer readable medium containing executable computer instructions for performing a method for determining a malicious program. In the method, a specific application programming interface (API) within an application program can be obtained. Call logic for calling the specific API can be determined and the call logic can include a triggering event to trigger the specific API to be called, a feedback path provided after the specific API is called, or a combination thereof. It can be determined whether the application program is a malicious program according to the call logic.

Other applications, advantages, alternations, modifications, or equivalents to the disclosed embodiments are obvious to those skilled in the art.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods, apparatus, and computer readable medium for determining a malicious program. In an exemplary method, a specific application programming interface (API) within an application program can be obtained. Call logic for calling the specific API can be determined and the call logic can include a triggering event to trigger the specific API to be called, a feedback path provided after the specific API is called, or a combination thereof. It can be determined whether the application program is a malicious program according to the call logic. Accordingly, an apparatus for determining a malicious program can include an obtaining module, a first determining module, and a second determining module. Accordingly, a computer readable medium containing executable computer instructions for performing a method for determining a malicious program can also be provided.

In this manner, by obtaining the specific API in the application program and determining the call logic for calling the specific API, it is determined whether the application program is a malicious program according to the call logic for calling the specific API. This can avoid manual testing procedures and improve testing efficiency. In addition, by using call logic for calling a specific API in an application program for possibly stealing user's private information and phone charges to determine whether the application program is a malicious program, degree of accuracy for determining a malicious program can be improved.

What is claimed is:

1. A method for determining a malicious program, comprising:
    decompiling an application program to obtain a decompiled code of the application program, wherein the application program is installed on a terminal device of a user;
    scanning the decompiled code to determine a specific application programming interface (API) from the decompiled code;
    obtaining the API within the decompiled code of the application program;
    determining a call logic for calling the specific API, wherein the call logic comprises a triggering event to trigger the specific API to be called, a feedback path provided after the specific API is called, or a combination of the trigger event and the feedback path; and
    determining whether the application program is a malicious program according to the call logic;
    wherein the application program is determined to be a malicious program when:
        the specific API is a function of connecting to a network to access a business for fee deductions, and the call logic is calling the specific API when the terminal device is powered on to self-start without being authorized by the user; or the specific API is a function of intercepting and replying a message for fee deductions; and the call logic is that after the specific API is called and the message for fee deductions is replied, a fee is charged to the terminal device of the user.

2. The method of claim 1, wherein the specific API comprises: a function of accessing user's private information, a function of modifying user's private information, a network access function, a call function, a message feedback function, a function of modifying system settings, a function of silently installing a third-party application program, a function of terminating a program process, or any combination of the previous functions.

3. The method of claim 1, wherein determining the call logic for calling the specific API comprises:
analyzing classes, functions, procedure events, and a calling relationship between functions in the decompiled code; and
extracting the call logic for calling the specific API from the decompiled code.

4. The method of claim 1, wherein determining whether the application program is a malicious program according to the call logic comprises:
matching the call logic with a pre-stored logic model, wherein the pre-stored logic model provides call logic for malicious programs; and
determining that the application program is the malicious program, when the call logic matches with call logic in the pre-stored logic model; or
determining that the application program is a safe program, when the call logic does not match with any call logic in the pre-stored logic model.

5. An apparatus for determining a malicious program, comprising:
one or more processors;
memory; and
one or more programs stored in the memory and to be executed by the one or more processors, the one or more programs are configured to:
decompile an application program to obtain a decompiled code of the application program;
scan the decompiled code to determine a specific application programming interface (API) from the decompiled code;
obtain the specific API within the application program;
determine a call logic for calling the specific API, wherein the call logic comprises a triggering event to trigger the specific API to be called, a feedback path provided after the specific API is called, or a combination of the trigger event and the feedback path; and
determine whether the application program is a malicious program according to the call logic;
wherein the application program is determined to be a malicious program when:
the specific API is a function of connecting to a network to access a business for fee deductions, and the call logic is calling the specific API when the terminal device is powered on to self-start without being authorized by the user; or
the specific API is a function of intercepting and replying a message for fee deductions; and the call logic is that after the specific API is called and the message for fee deductions is replied, a fee is charged to the terminal device of the user.

6. The apparatus of claim 5, wherein the specific API comprises: a function of accessing user's private information, a function of modifying user's private information, a network access function, a call function, a message feedback function, a function of modifying system settings, a function of silently installing a third-party application program, a function of terminating a program process, or any combination of the previous functions.

7. The apparatus of claim 5, wherein, to determine the call logic for calling the specific API, the processor is further configured to analyze classes, functions, procedure events, and calling relationship between functions in the decompiled code to extract the call logic for calling the specific API from the decompiled code.

8. The apparatus of claim 5, wherein, to determine whether the application program is a malicious program according to the call logic, the processor is further configured to:
match the call logic with a pre-stored logic model, wherein the pre-stored logic model provides call logic for malicious programs; and
determine that the application program is the malicious program, when the call logic matches with call logic in the pre-stored logic model; or
determine that the application program is a safe program, when the call logic does not match with any call logic in the pre-stored logic model.

9. A non-transitory computer readable medium containing executable computer instructions for performing a method for determining a malicious program, comprising:
decompiling an application program to obtain a decompiled code of the application program;
scanning the decompiled code to determine a specific application programming interface (API) from the decompiled code;
obtaining the specific application programming interface (API) within the application program;
determining a call logic for calling the specific API, wherein the call logic comprises a triggering event to trigger the specific API to be called, a feedback path provided after the specific API is called, or a combination of the trigger event and the feedback path; and
determining whether the application program is a malicious program according to the call logic;
wherein the application program is determined to be a malicious program when:
the specific API is a function of connecting to a network to access a business for fee deductions, and the call logic is calling the specific API when the terminal device is powered on to self-start without being authorized by the user; or
the specific API is a function of intercepting and replying a message for fee deductions; and the call logic is that after the specific API is called and the message for fee deductions is replied, a fee is charged to the terminal device of the user.

10. The medium of claim 9, wherein the specific API comprises: a function of accessing user's private information, a function of modifying user's private information, a network access function, a call function, a message feedback function, a function of modifying system settings, a function of silently installing a third-party application program, a function of terminating a program process, or any combination of the previous functions.

11. The medium of claim 9, wherein determining the call logic for calling the specific API comprises:
   analyzing classes, functions, procedure events, and a calling relationship between functions in the decompiled code; and
   extracting the call logic for calling the specific API from the decompiled code.

12. The medium of claim 9, wherein determining whether the application program is a malicious program according to the call logic comprises:
   matching the call logic with a pre-stored logic model, wherein the pre-stored logic model provides call logic for malicious programs; and
   determining that the application program is the malicious program, when the call logic matches with call logic in the pre-stored logic model; or
   determining that the application program is a safe program, when the call logic does not match with any call logic in the pre-stored logic model.

13. The method according to claim 4, wherein the pre-stored logic model comprises:
   calling the specific API to execute without authorization; and
   returning a calling result to a designated address after the specific API is called.

14. The method according to claim 1, wherein the application program is determined to be a malicious program when:
   the specific API is a function of reading a private information of the user, the private information being one or more of an address book, messages, call records, and contact information; and
   the call logic is calling the specific API without being authorized by the user, including calling the specific API when the terminal device is powered on to self-start, and returning the private information to a designated address after calling the specific API.

15. The method according to claim 1, wherein the application program is determined to be a malicious program when:
   the specific API is a function of silently installing a third-party application program; and
   the call logic is automatically installing a software product with charges without authorization by the user.

16. The method according to claim 1, wherein the application program is determined to be a malicious program when:
   the specific API is a function of silently terminating a program process; and
   the call logic is automatically terminating currently operated programs without authorization by the user when the application program is in operation.

\* \* \* \* \*